(12) United States Patent
Xu et al.

(10) Patent No.: US 7,773,221 B2
(45) Date of Patent: Aug. 10, 2010

(54) INDUSTRIALLY ROBUST NON-CONTACT COLOR MEASUREMENT DEVICE

(75) Inventors: Zhiling Xu, Grand Rapids, MI (US); Peter G. VanderJagt, Belmont, MI (US); Steven Henry Peterson, Wyoming, MI (US)

(73) Assignee: X-Rite, Inc., Grand Rapids, MI (US)

( * ) Notice: Subject to any disclaimer, the term of this patent is extended or adjusted under 35 U.S.C. 154(b) by 625 days.

(21) Appl. No.: 11/820,089

(22) Filed: Jun. 18, 2007

(65) Prior Publication Data
US 2008/0002204 A1  Jan. 3, 2008

Related U.S. Application Data

(60) Provisional application No. 60/814,817, filed on Jun. 19, 2006.

(51) Int. Cl.
*G01J 3/46* (2006.01)
(52) U.S. Cl. ..................................... 356/402
(58) Field of Classification Search ................ None
See application file for complete search history.

(56) References Cited

U.S. PATENT DOCUMENTS

| | | | |
|---|---|---|---|
| 5,760,900 A * | 6/1998 | Ito et al. ............... | 356/338 |
| 6,025,956 A * | 2/2000 | Nagano et al. .......... | 359/386 |
| 6,384,918 B1 | 5/2002 | Hubble, III et al. | |
| 6,888,633 B2 | 5/2005 | Vander Jagt et al. | |
| 7,092,097 B2 | 8/2006 | Cargill et al. | |
| 7,145,657 B2 | 12/2006 | Peterson et al. | |

| | | |
|---|---|---|
| 2005/0062968 A1 | 3/2005 | Peterson et al. |

FOREIGN PATENT DOCUMENTS

| | | |
|---|---|---|
| EP | 1262749 | 12/2002 |
| EP | 1519169 | 3/2005 |
| WO | 02/093142 | 11/2002 |

OTHER PUBLICATIONS

Partial PCT Search Report dated Jan. 23, 2008.
http://www.newtone.fr/dossiers_PDF/EQU0836OCSSpecsheets(REV1.1).pdf; EQUISPEC Online Color Spectrophotometer, product literature (2 pages).
http://www.equitechintl.com; Large Area Surface Probe, product literature (6 pages).

(Continued)

*Primary Examiner*—Tu T Nguyen
(74) *Attorney, Agent, or Firm*—McCarter & English, LLP (57) ABSTRACT

A color measurement device designed for use at various stages of an industrial process is provided. The device offers enhanced insensitivity to ambient light, measurement depth variations, and/or ambient or environmental temperature variations. The device may be embodied as an LED-based, non-contact color measurement spectrophotometer. Over-illumination in full-spectrum of the target object facilitates effective color measurements over varying depths of view. Collected light is measured at discrete wavelengths across the entire visual spectrum. The hardened, rugged design and packaging of the measurement device allows color measurement to be performed at various stages of industrial processes wherein the device can add value by enabling enhanced detection of color errors.

30 Claims, 9 Drawing Sheets

OTHER PUBLICATIONS http://www.xrite.com/product_overview.aspx; TeleFlashSystem: TeleFlash 130 Non-Contact Sptrophotometer; product literature (2 pages).

http://www.xrite.com/product_overview.aspx; TeleFlashSystem: TeleFlash 445 Non-Contact Sptrophotometer; product literature (2 pages).

http://www.xrite.com/product_overview.aspx; TeleFlashCompact: TeleFlash Compact Non-Contact Sptrophotometer; product literature (2 pages).

http://www.equitechintl.com; Equispec™ Chemical Process Analyzer (CPA); product literature (2 pages).

* cited by examiner

INDUSTRIALLY ROBUST NON-CONTACT COLOR MEASUREMENT DEVICE

CROSS-REFERENCE TO RELATED APPLICATIONS

The present application claims the benefit of the priority of U.S. Provisional Patent Application No. 60/814,817, entitled "Industrially Robust Non-Contact Color Measurement Device, which was filed on Jun. 19, 2006, and the contents of which are hereby incorporated by reference.

TECHNICAL FIELD

The present disclosure generally relates to determining the color of a target object. The present disclosure more particularly relates to color measurement devices structured for conducting color measurements.

BACKGROUND

In many manufacturing processes, color is often a key parameter that must be controlled. To control color quality, high precision spectrophotometers have been used to evaluate incoming raw materials and finished products to attempt to address issues with color. However, an obstacle to accurate and consistent color measurement arises from the fact that environments in which "on-line" or "in process" measurements of manufactured products need to be conducted are typically more challenging than environments in which raw materials or finished products are evaluated. There is an unsatisfied need for more industrially robust instrument solutions that can better enable color measurement capability at various stages throughout a manufacturing process. Instruments are needed that can maximize the volume of materials and products that can be inspected; and that permit measurements to be conducted at different stages of industrial processes to allow more effective opportunities for corrective action and thereby reduce material waste, product rework and downtime.

In particular, the capacity to make non-contact color ("NCC") measurements is lacking in many devices. For example, a sample to be measured may have a finished surface that should not be touched at certain stages of production, such as in the case of many painted automotive parts. In certain manufacturing processes, the desired point of measurement for a component or material is at a stage in production when the component is still wet or soft and contact with a measurement device would damage or mar the component. In other situations, NCC measurement may be desirable because a part is too hot to be touched or should not be contaminated by contact, such as in the case of the food processing industry.

Also, the distance between a sample and the sensor of the measurement device sensor often varies during production, and this can adversely impact measurement consistency. In many manufacturing environments, adequate staging of a sample to be tested that would allow repeatable measurement distance control is not practical or feasible. Traditional color measurement devices are usually negatively affected by the "inverse square law" with respect to illumination, sensing, or both. Devices and processes are needed that can reduce or compensate for the measurement distance variations inherent in many manufacturing processes.

Another factor is the capability to make NCC measurements in ambient light. In many cases, it is not easy to find a sufficiently darkened location on a sample from which to derive a suitable measurement. One possible solution is to overpower the ambient light conditions by using a high power xenon flash illumination, for example, with the instrument. This solution is problematic, however, because it does not work well with samples that have photochromatic properties, and there are product power and life cycle issues presented by the use of such illumination.

In addition, devices need the ability to make color measurements in industrial environments affected by temperature, vibration, and the presence of particulate or liquid contaminates. Such devices need to be capable of providing stable measurements independent of the operating temperature of the environment, for example. Shock and vibration, humidity, particulate or liquid contamination, and cleaning operations must be endured by the sensing or illumination ports of the devices without affecting their measurement capacity.

Furthermore, high intensity and good uniformity of illumination is usually advantageous to the illumination system of a color measurement device. However, high quality illumination often requires a complicated light collecting lens system specially designed to eliminate spherical aberrations and other undesirable effects. In another approach, in a more simplified system, if an increase in light intensity is attempted by collecting light from a larger cone angle, for example, then the uniformity of the illumination can be impacted due to the effects of spherical aberrations.

In view of the foregoing issues, what are needed are more effective and efficient devices, structures and processes for measuring color, especially in industrially challenging environments.

SUMMARY

The present disclosure provides color measurement devices and systems that facilitate color measurements in challenging environments, e.g., at various stages of an industrial process. The disclosed devices and systems are substantially insensitive to ambient light, thereby enhancing the utility and performance thereof. The disclosed devices and systems are also adapted to effect reliable color measurements and varying depths. In particular, the disclosed devices and systems are structured so as to address and overcome potential issues associated with the inverse square rule. Still further, exemplary embodiments of the present disclosure are adapted to operate effectively despite potential variations in ambient and/or environmental temperature conditions.

Exemplary embodiments of the present disclosure include an LED-based illumination source and a non-contact color measurement spectrophotometer/color engine. The LED-based illumination source is generally adapted to generate/supply light across the entire visible spectrum, e.g., from 390 nm to 710 nm. An optical collection system is incorporated into the disclosed color measurement devices/systems, such optical collection system generally being adapted to move relative to the target object so as to vary the depth of view. The illumination source is advantageously adapted to over-illuminate the target area, thereby ensuring that variations in the depth of view does not encompass non-illuminated regions of the target object. In exemplary embodiments, such over-illumination extends the illuminated area to a region that is at least 50% greater in diameter as compared to the lower boundary of the target measurement area.

The color engine is advantageously adapted to measure the collected light on a wavelength-by-wavelength basis, e.g., at 10 nm increments. In exemplary embodiments, a color wheel is provided to facilitate such wavelength-specific measurement processing. The color wheel may operate in conjunction with a stepper motor to cycle through the wavelengths-of-interest, e.g., the entire visible spectrum.

In further exemplary embodiments of the present disclosure, active targeting of the target area to be measured is facilitated. Thus, for example, a secondary illumination source may be provided in conjunction with the optical collection system, e.g., as a ring around the collection optic, to provide retro-illumination of the target location. A synchronous modulation system may be provided to facilitate exclusion of ambient light. Alternative approaches to ambient light exclusion may also be employed, e.g., a quantitative approach that subtracts the potential ambient light effect, as is known in the art.

In addition, the hardened, rugged design and packaging of the disclosed measurement devices and systems advantageously allow color measurement to be performed at various stages of industrial processes wherein the device can add value by enabling enhanced detection of color errors.

Additional advantageous features, structures and functions of the disclosed color measurement devices and systems will be apparent from the description which follows, particularly when read in conjunction with the figures appended hereto.

BRIEF DESCRIPTION OF THE FIGURES

The utility of the embodiments of the invention will be readily appreciated and understood from consideration of the following description of exemplary embodiments and/or implementations when viewed in connection with the accompanying drawings.

DESCRIPTION OF EXEMPLARY EMBODIMENT(S)

The present disclosure provides embodiments of a color measurement device/system designed for use in a host of commercial and/or industrial applications, e.g., at various stages of an industrial process (e.g., a manufacturing line). The disclosed devices and systems offer enhanced insensitivity to: ambient light, measurement depth variations, and/or ambient or environmental temperature variations. In certain exemplary embodiments, the color measurement devices and systems of the present disclosure may be embodied as an LED-based, non-contact color measurement spectrophotometer. The present disclosure thus provides new and cost effective solutions to enhance process monitoring and quality control in a variety of industrial environments. The hardened, rugged design and packaging of the measurement devices and systems described herein allow color measurement to be applied at stages of industrial processes where the devices/systems can add value by enabling enhanced detection of color errors, for example.

Figure 1:
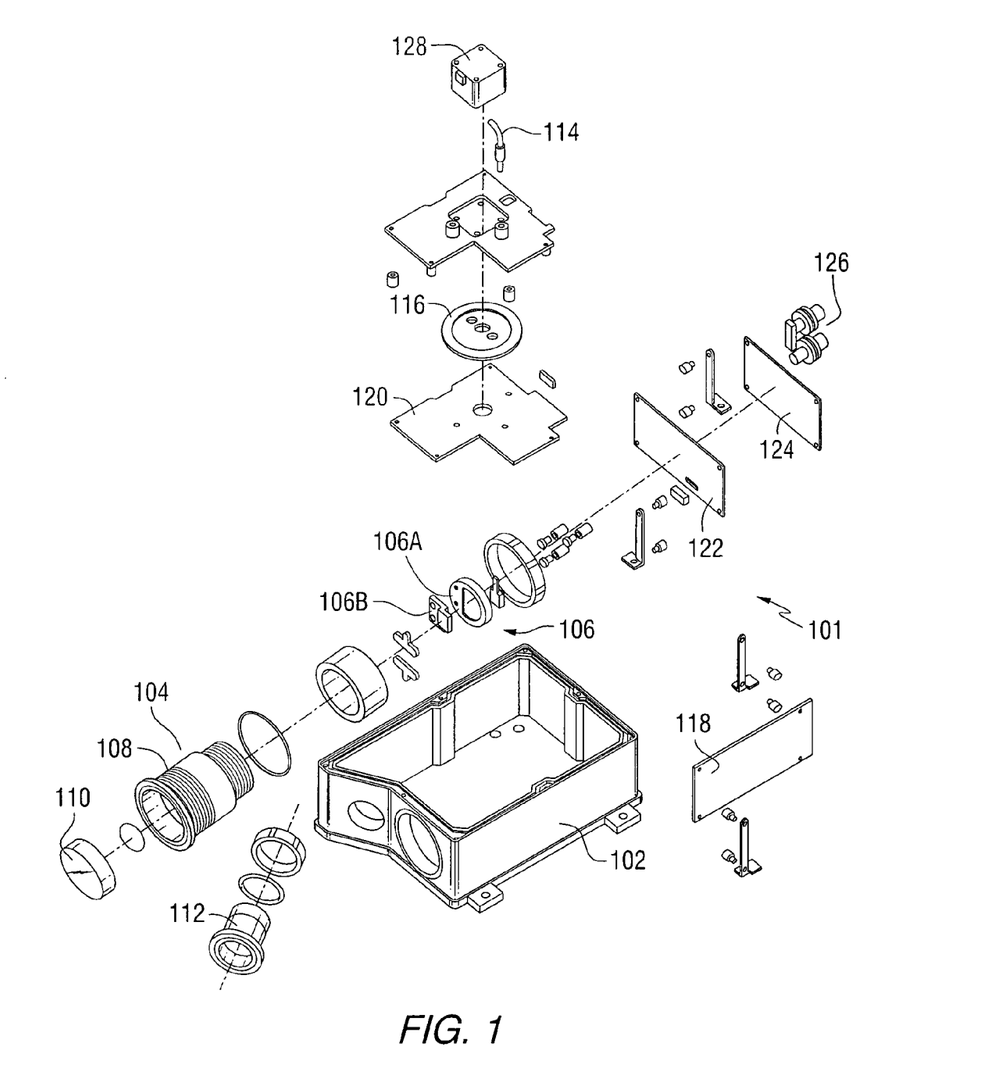
FIG. 1 is an exploded/disassembled perspective view of a color measurement device that can be provided in accordance with various embodiments of the present disclosure.
Figure 2:
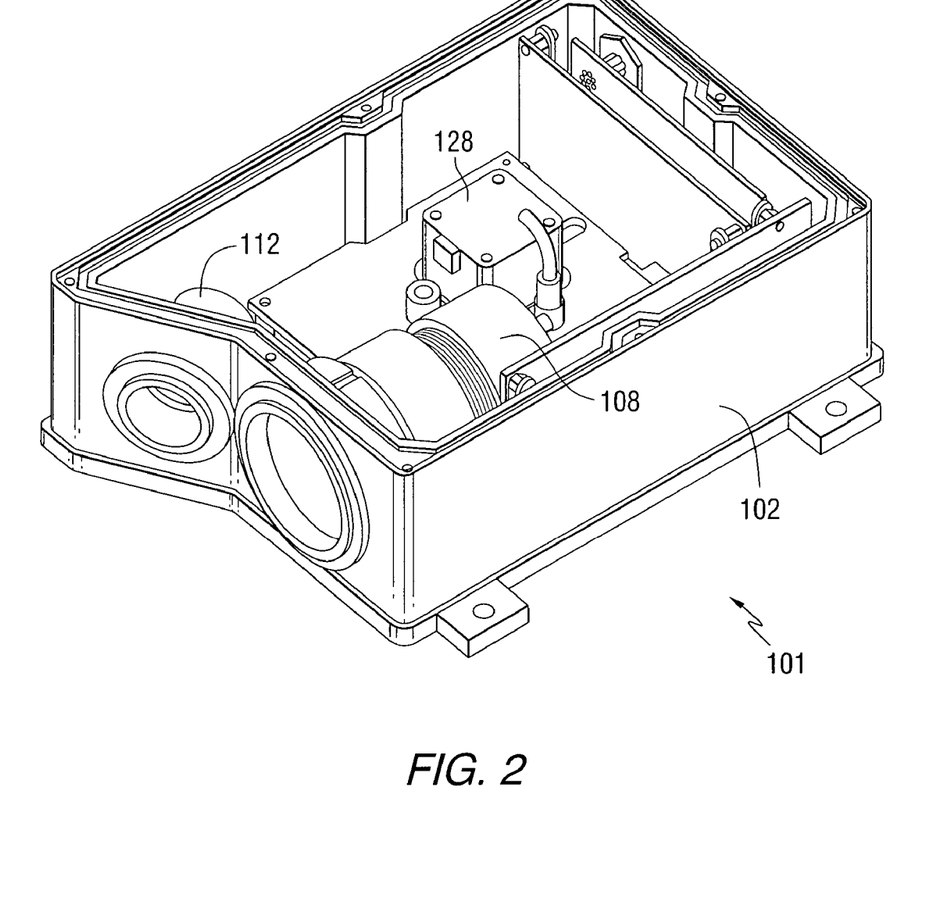
FIG. 2 is an assembled perspective view of the exemplary device shown in FIG. 1.

With reference to FIGS. 1 and 2, a color measurement device 101 is illustrated that can be structured in accordance with various embodiments of the present disclosure. As shown, FIG. 1 provides an exploded/disassembled perspective view of the device 101; and, FIG. 2 provides an assembled view of the device 101 of FIG. 1. The device 101 includes a housing 102 (with cover not shown for clarity of illustration) structured to provide a protective enclosure for operative aspects thereof. The housing 102 may be constructed in accordance with an appropriate standard (e.g., NEMA-4) to withstand the rigors of various industrial environments and to protect the various components and systems described below.

The device 101 may include an illumination system 104 having an illuminator 106 that advantageously includes an Active Thermal Stabilization ("ATS") block 106A on which an illumination source 106B can be mounted, an anti-reflective tube 108, and an illumination object lens 110. The anti-reflective tube 108 may be of a type generally known to those skilled in the art and may include internal saw-tooth circumferential ribs and a black matte finish, for example. The lens 110 can be selected so that the illumination system 104 provides spatially uniform illumination or irradiance, particularly at a given target distance from a target or sample object to be measured for color characteristics. The term "spatially uniform" as applied herein means that flux is uniform throughout the cross section of the illumination beam. In various embodiments, the lens 110 may be any one of a variety of suitably optically "fast" lenses known to those skilled in the art.

The illumination source 106B may include an LED cocktail having multiple light sources, such as multiple LEDs, for example. In various embodiments, the LEDs may be selected for the illumination source 106B to provide a full or substantially full spectrum illumination source that can function in association with a "fast" and highly uniform, multi-element searchlight optic, for example. In certain embodiments, the illumination source 106B may be a hybrid of white die plus chromatic die, and/or may utilize a high power white LED with a supplemental chromatic die to achieve a full or nearly full spectrum (e.g., 390 nm-710 nm) white light source that can generate optical energy or light across the entire visible spectrum. The white die and chromatic die may be configured in the illuminator 106 in a clustered package that provides a relatively small illumination source diameter to approximate a point source for the illumination system 104.

In order to capture as much energy as possible from the LED illumination source 106B, a "fast" optical system can be employed to capture as much solid angle as possible from the searchlight beam generated by the illumination system 104. The resultant collimated searchlight beam can then be directed at a target object to be measured to spatially over-illuminate a predetermined area or location on the target object by a sufficient margin. It can be seen that the illumination system 104 provides a light source that covers the full visible spectrum and appears to be searchlight-like in its origin, so it is thus insensitive to the inverse square law. Using LEDs in the illumination source 106B provides solid-state light-generating devices that can be modulated for operation at frequencies in the range of 25 kHz and higher. In exemplary embodiments of the present disclosure, the disclosed LEDs operate at frequencies of about 75 kHz to 85 kHz, or higher, as described in more detail below.

Figure 3:
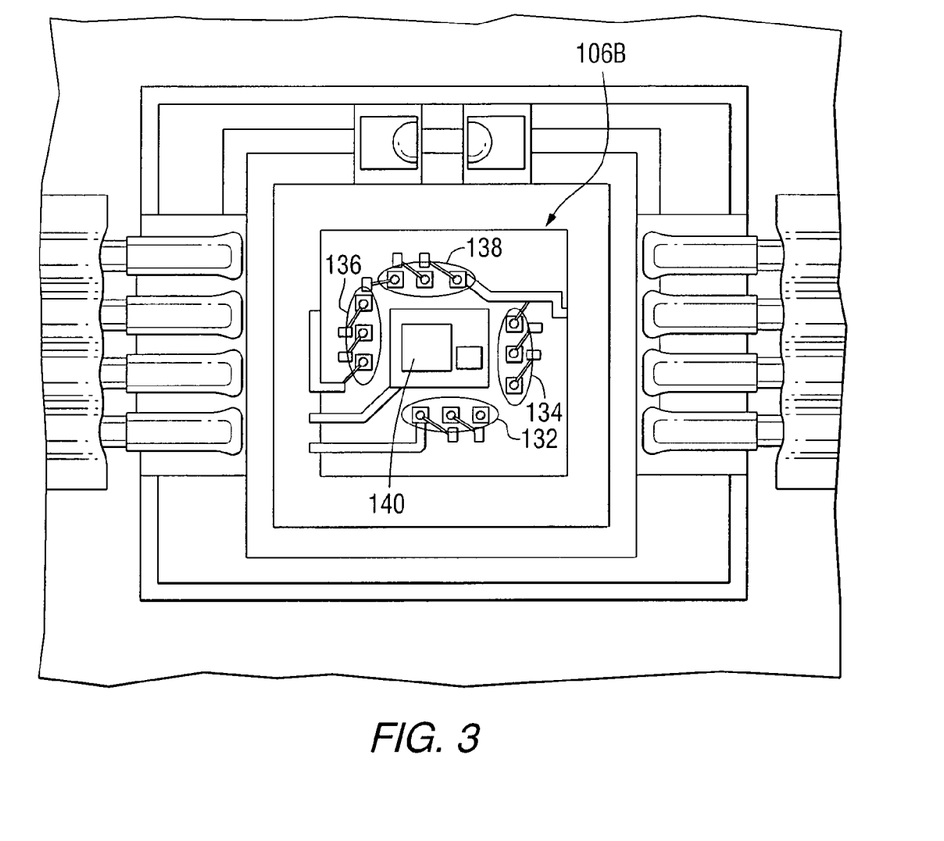
FIG. 3 illustrates an illumination source that can be provided in accordance with various embodiments of the present disclosure.
Figure 4:
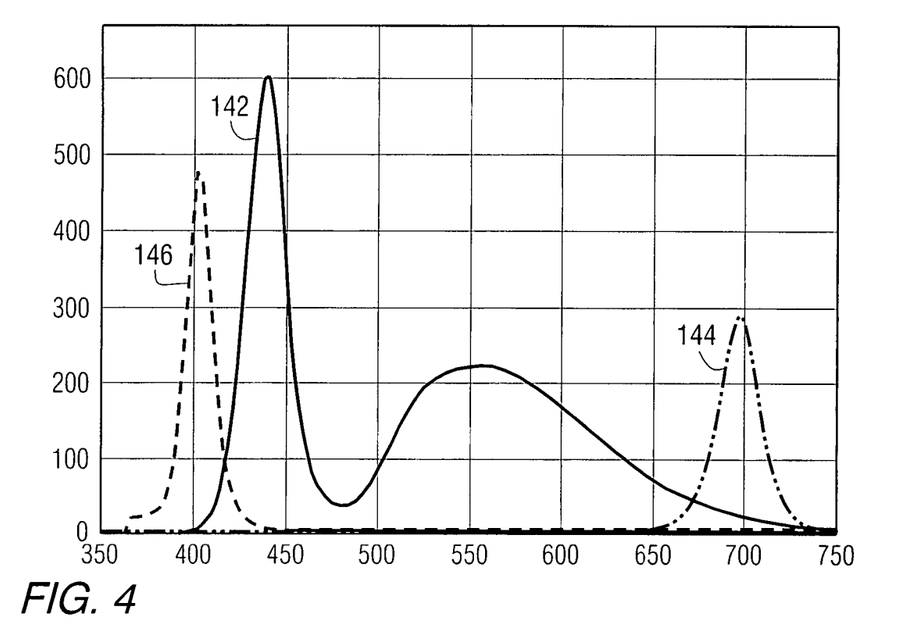
FIG. 4 provides a graphical representation of an exemplary intensity profile of the illumination source of FIG. 3.

With reference to FIG. 3, an example of an LED configuration for the illuminator 106 is illustrated. In the configuration shown, the illuminator 106 includes an illumination source 106B comprised of two groups of red LEDs (132, 134), two groups of blue LEDs (136, 138), and a group of white LEDs 140. The graph of FIG. 4 shows light energy generated across the visible spectrum with contributions from each of the LED groups 132-140 of the illuminator 106. The curve 142 represents the energy contribution from the white LED group 140; the curve 144 represents energy supplied by the supplemental red LED groups 132, 134, centered at approximately 695 nm; and, the curve 146 represents the energy contributed to the cocktail of the illumination source 106B by the blue LED groups 136, 138, centered at approximately 405 nm.

Figure 5A:
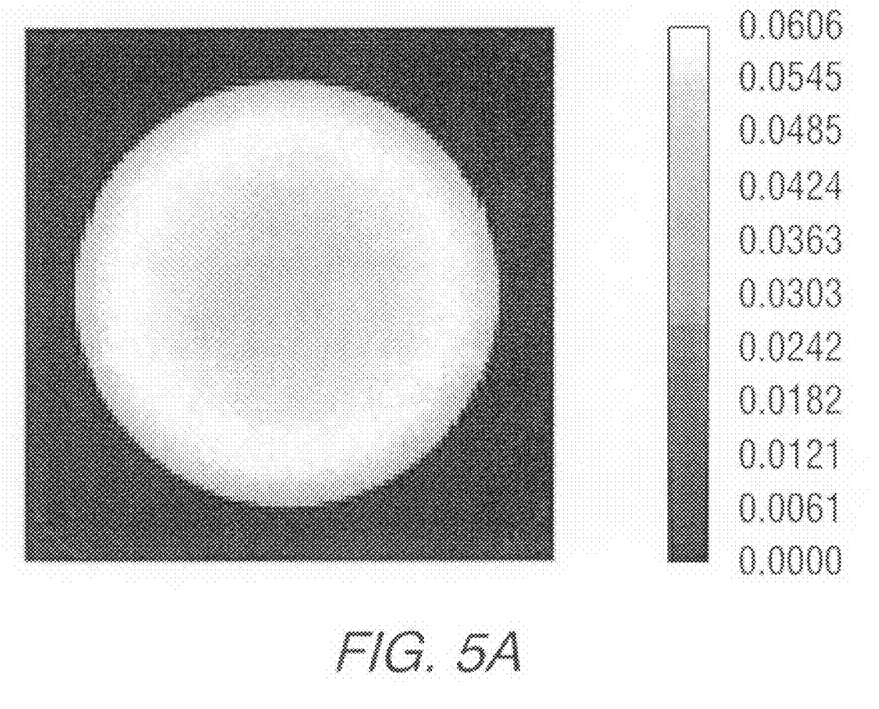
FIG. 5A provides an illustration of the intensity of an illumination source.
Figure 5B:
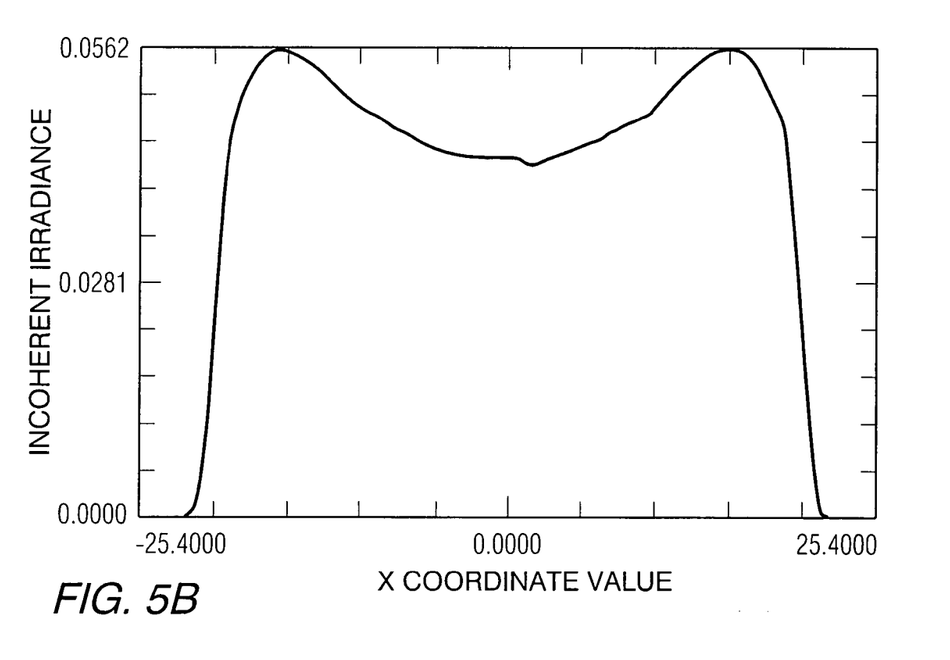
FIG. 5B provides a graphical representation of the intensity profile of the illumination source shown in FIG. 5A.

In various embodiments of the present disclosure, a technique can be used to address potential chromatic and spherical irradiance distortions that may arise in association with operation of the illumination system 104. More particularly, in the illumination system 104, a relatively high magnification or shorter focal length is a desirable characteristic for the lens 110 to allow as much collimated light as possible to be developed from the illumination source 106B. It can be seen, however, that using such a "fast" lens 110 may create certain undesirable chromatic and spherical aberrations, resulting potentially in nonuniformity in the illumination beam emanating from the illumination system 104. As shown in FIG. 5A, this nonuniformity may arise as a ring around the edge of the illumination beam which is comparatively brighter than the center of the beam. FIG. 5B includes a graphical profile representing this nonuniformity in intensity across the illumination beam.

Figure 6:
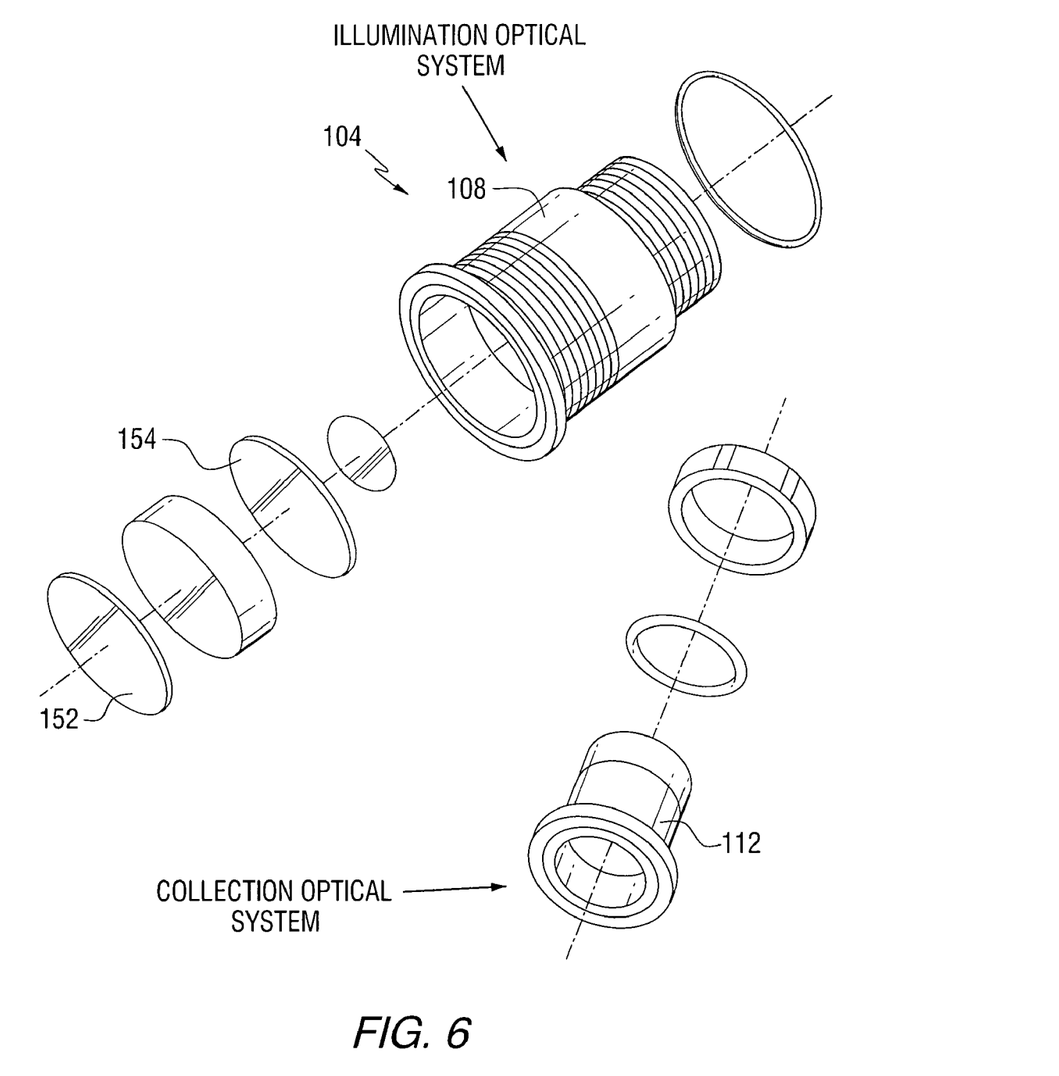
FIG. 6 provides an exploded/disassembled perspective view of a portion of the color measurement device of FIG. 1, including multiple spatial intensity filters.

With reference to FIG. 6, one or more spatial intensity filters 152, 154 can be positioned next to the back plane or next to the front plane of the lens 110 to compensate for potential nonuniformities in the field of illumination. Preferably, one of the spatial intensity filters 152, 154 is placed as near to the plane of the lens 110 as possible. The spatial intensity filters 152, 154 may be a film comprised of plastic, Mylar or another suitable material. In certain embodiments of the device 101, it is preferred to use one filter in the position of filter 154 to resist damage to the filter 154 during operation and use of the device 101. In further exemplary embodiments of the present disclosure, the disclosed spatial intensity lens may be integrally formed with the disclosed illumination lens, e.g., by laser engraving of the spatial intensity filter with respect to the illumination lens. It can be appreciated that use of one or both such filters 152, 154 allows the illumination system 104 to work in association with a "fast" lens 110 and reduce or eliminate the adverse effects of the inherent nonuniformity arising from such "fast" lenses.

Figure 7A:
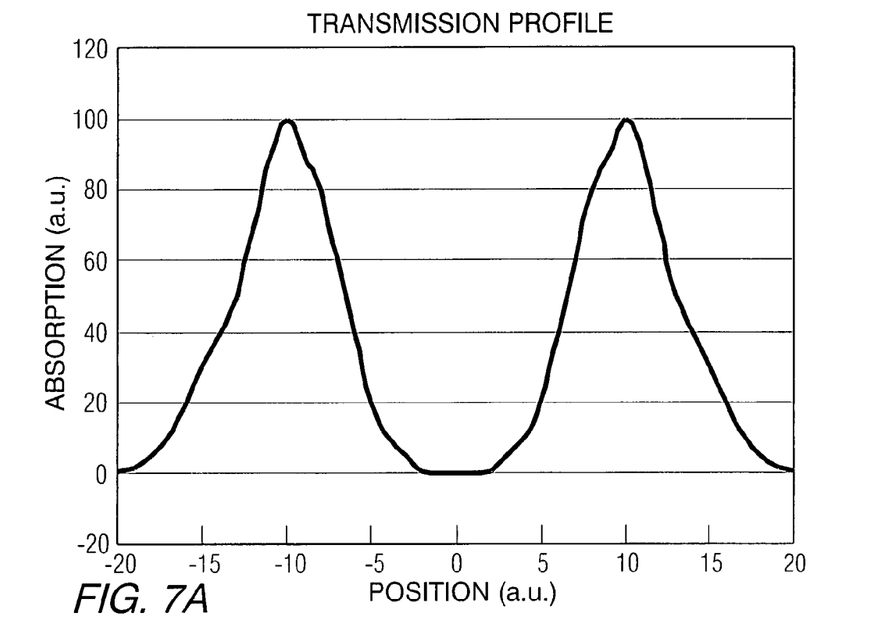
FIGS. 7A and 7B provide graphical representations of additional intensity profiles.
Figure 7B:
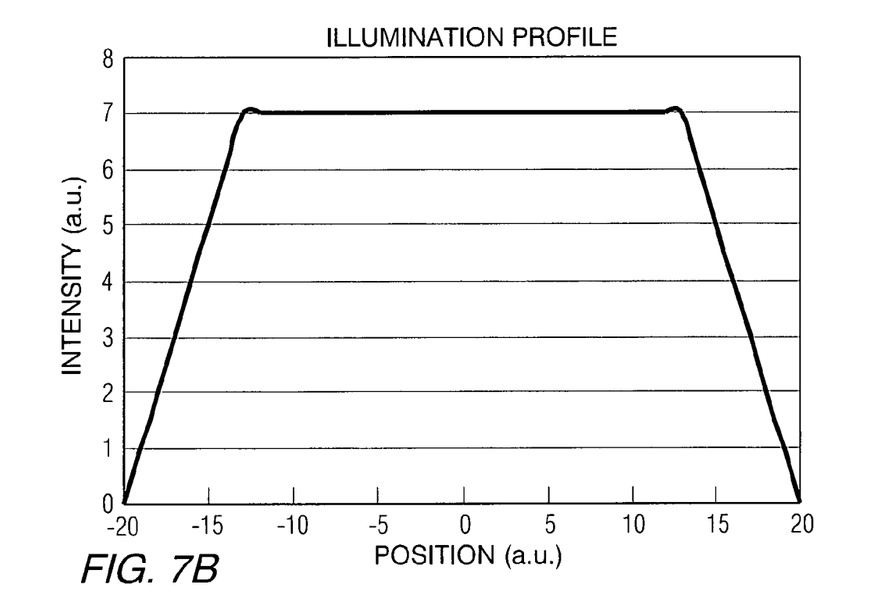

As shown in FIG. 7A, a graphical profile represents an inverse spatial intensity pattern that can be applied to the illumination source illustrated in FIGS. 5A and 5B in the form of the spatial intensity filters 152, 154. The result of the application of this inverse spatial intensity pattern is shown in FIG. 7B, which shows a resultant "flat top" profile that exhibits a substantially uniform illumination source. It can be seen that the spatial intensity filters 152, 154 can be used to absorb the peaks of a non-uniform illumination pattern, and thus can reduce ripples or other aberrations in an illumination intensity pattern. In certain embodiments, a computer system or a controller may be employed as a spatial intensity filter to generate and apply an inverse pattern that promotes a more uniform illumination source.

Figure 8:
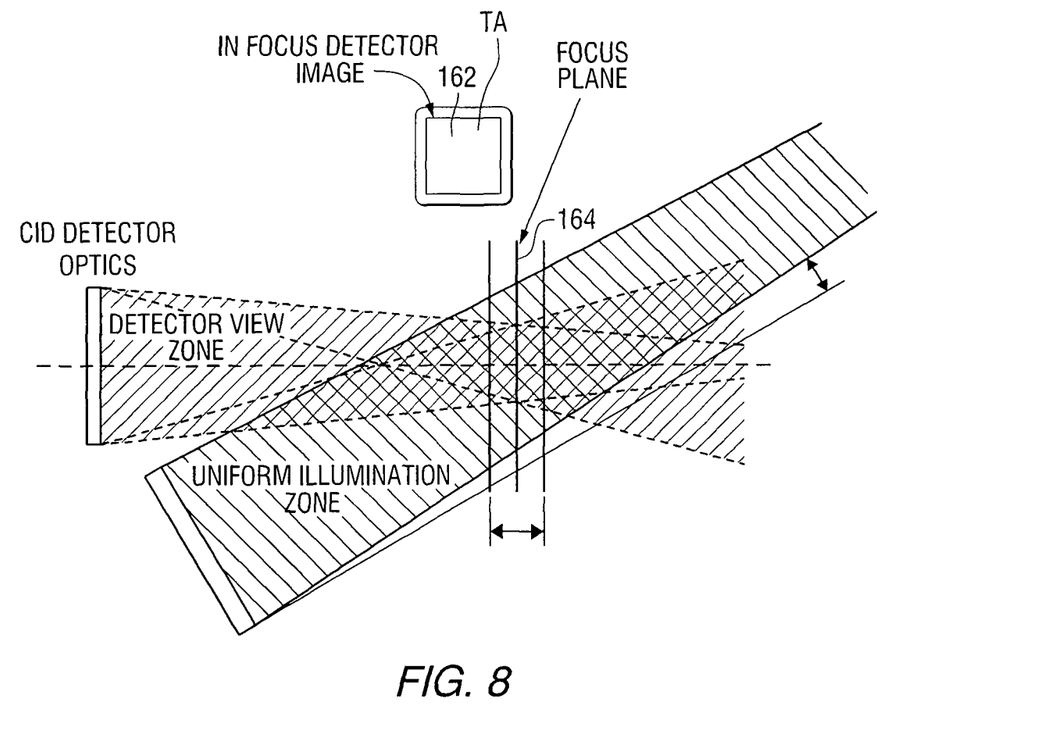
FIG. 8 provides a schematic representation of certain exemplary illumination and detection aspects that can be provided in accordance with various embodiments of the present disclosure; and, FIG. 9 provides a schematic representation of certain exemplary detection aspects that can be provided in accordance with various embodiments of the present disclosure.

With reference to FIGS. 1 and 8, the device 101 may include an optical collection system having an image-based collection optic 112 with a field stop at an image plane of the collection system to promote high target selectivity for target objects to be measured. The device 101 may also include a structure or feature that permits a user to actively identify the targeted zone or area 162 for measurement. In operation of the device 101, light cast on a test object from the illumination system 104 reflects back to the device 101 and is collected by the collection optic 112 for processing through the optical collection system and a color engine of the device 101. The collection optic 112 may be positioned at 30°, 45° or another suitable, pre-defined geometry relative to the axis of the illumination system 104.

The collection optic 112 places a focused image of the sample plane 164 onto the image plane that contains a field stop to define the measured target area 162. For example, the light can be imaged onto a fiber optic collector 114 wherein the diameter of the fiber optic collector 114 becomes a field stop and essentially defines the target area. Light originating from outside the desired measurement target area 162 falls outside of the field stop in the focused image plane and is thereby rejected by the fiber optic collector 114. Light originating from inside the desired measurement target area 162 in the sample plane 164 of interest passes through the field stop and is transmitted to the color engine of the device 101 for subsequent spectral analysis. The target area 162 may be imaged with a $\frac{1}{8}^{th}$ magnification, for example, onto the fiber optic collector 114 to facilitate focusing the image on the fiber optic collector 114. The device 101 may then employ its color engine, including use of a filter wheel 116, for example, to determine the color of the measured target area on wavelength-by-wavelength basis. Indeed, in exemplary embodiments of the present disclosure, collected light is measured at discrete 10 nm wavelength increments across the entire visible spectrum (e.g., from 390 nm to 710 nm).

In various embodiments, the collection optical system of the device 101 may also provide a feature to actively shine light back through the field stop at the image plane, and through the multi-element collection optic 112, to a focused spot or region on the measurement plane 162. This reverse illuminated target area generally correlates exactly to the spot/region measured by the same optic and provides an enhanced targeting scheme when aligning the device 101 for taking measurements.

It can be appreciated that the positional sensitivity of a color measurement device is a critical parameter due to the combinatorial effect of two basic factors. First, the distance between the device 101 and the target sample can vary during an industrial process. This is attributable to the positional repeatability error of robotic fixtures, for example, and other industrial equipment. In addition, the target area on the sample to be measured may vary positionally from piece to piece, material to material, part to part, etc. The second factor relates to the inverse square law. Specifically, the intensity of light radiating at multiple angles from a point decreases in intensity by the inverse square of the distance. Consequently, even at a nominal target distance of 1.5 inches, for example, a variation of even 0.1 or 0.2 inches in the distance of a measurement device from the target sample can introduce significant error into the color measurement in conventional devices/systems.

Figure 9:
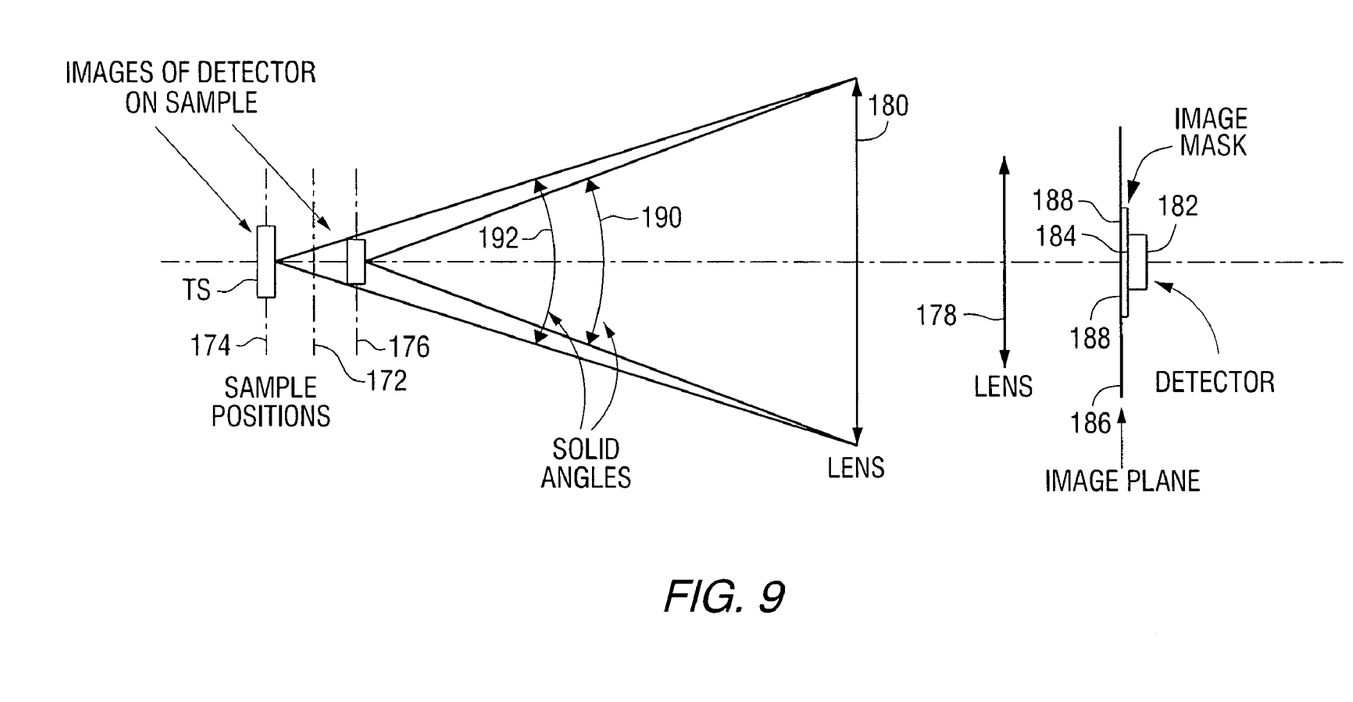

With reference to FIG. 9, various portions of the optical collection system of the device 101 are schematically illustrated to demonstrate the capability of the optical collection system to conduct NCC measurements. An example of a target sample position is illustrated at 172, and the acceptable target sample range extends between the positions 174 and 176. The system may include one or more lenses 178, 180, whose focal length is the distance between the lens 178 and the target sample position 172. The lenses are positioned between a photodiode detector 182 and the target sample TS. The lenses 178, 180 may be provided in a two-piece lens assembly as shown, including a plano-convex lens 178 and an aspheric lens 180, for example. Such a lens system is considered optically "fast" in that it can enhance light gathering efficiency and thus improve signal strength. In certain embodiments, a single lens can be employed.

In operation of the device 101, the optical collection system images the desired target area TA (see also FIG. 8) of the target sample TS onto a fixed area 184 of the image plane 186 of the detector 182. The size and shape of the fixed area 184 can be defined by a mask 188 adjacent to and/or on the image plane 186. The mask 188 provides a generally crisp edge to the fixed area 184 and may be provided as a relatively thin, opaque material (e.g., metal foil) to enhance the crispness of the edge. The front of the mask 188 may be dark (e.g., black matte) to absorb stray light. In certain embodiments, the mask 188 can be coated on or otherwise applied to the detector 182.

As illustrated in FIGS. 8 and 9, the solid angle 190 collected by the optical collection system is relatively large when the target sample TS is in the closest position 176. Conversely, the solid angle 192 is the smallest when the target sample TS is in its farthest position 174. In the closest position 176, the target area TA of the target sample TS imaged onto the detector 182 is smaller than the target area TA when the sample is in the preferred position 172; and the target area TA of the target sample TS imaged onto the detector 182 when the target sample TS is in the farthest position 174 is relatively large. As long as the distance between the sample positions 174 and 176 is small in comparison to the other distances, such as the focal distance of the lens system, then these two effects (solid angle and target area) essentially cancel each other out, thus providing a constant detector 182 signal for samples with the same radiance. In other words, the product of the target area and the solid angle captured by the lens system is substantially equal in all cases between positions 174 and 176. The radiance of the samples is the same because the illumination field irradiance is the same (as discussed above) due to the searchlight illumination impinging on the target sample TS.

In various embodiments, with reference again to FIG. 1, the device 101 of the present disclosure includes an LED drive 118 and detector electronics 120 that provide a synchronous modulation system that preserves the dynamic range of the detector while excluding significant amounts of ambient light (as well as temporal variations of light) from the color measurement as a function of frequency. Examples of frequency modulation for illumination sources and light sensing or detection systems are disclosed in a commonly owned United States patent entitled, "Color Measurement Instrument with Modulated Illumination" (Vander Jagt et al., U.S. Pat. No. 6,888,633; issued May 3, 2005), the entirety of which is incorporated herein by reference. Given the above-described optical system embodiments, exemplary device 101 takes advantage of the relatively fast response time of the LED and modulates its output at a relatively high frequency (e.g., at frequencies at or greater than 25 kHz and, in certain implementations, as high as about 75 kHz, e.g., in the range of 75-85 kHz). At the higher frequency levels, the disclosed system operates well above the 25 kHZ needed to operate beyond the high frequency signal variations found in conventional lighting systems, e.g., fluorescent light with conventional electronic ballast systems. The photodiode sensor circuitry may also be designed to respond synchronously to the same modulation frequency and can thus reject natural ambient light with DC signal profiles, for example, as well as other man-made forms of light (e.g., incandescent, fluorescent, mercury vapor, sodium pressure, and others).

To be immune to ambient light, the photodiode components of the device 101 can be sensitized and synchronized to the modulated timing on the LED illumination source 106B, so that only modulated light is detected and the effect of any other ambient light can be reduced or eliminated. Those skilled in the art can appreciate that selection of photodiodes with relatively low capacitance is desirable in view of the frequency ranges employed by embodiments of the present disclosure. In addition, the filter wheel 116 can be configured with multiple, different interference filters at each light wavelength to enhance the performance of the synchronous modulation system.

In various embodiments, the device 101 may employ a thermal management system to maintain stable die temperature profiles for the LED illumination source 106B. For example, the illuminator 106 may employ a common substrate with relatively high thermal conductivity and a sensing thermistor to manage die temperatures. Further, to drive overall instrumental accuracy, especially in the case of extended thermal operational ranges (e.g., 0° C. to 50° C.), the design may also utilize ATS techniques (e.g., ATS block 106A) to maintain tighter tolerances on thermal profiles of the LED die substrate during standby and during measurement. Examples of ATS components and techniques that can be applied to embodiments of the present invention are disclosed in a commonly owned published patent application entitled, "Color Measurement Instrument" (Peterson et al., Ser. No. 10/669,110, filed Sep. 23, 2003, U.S. Pub. No. 2005/0062968), the entirety of which is incorporated herein by reference.

In various embodiments, the device 101 may employ one or more microprocessors or other computer systems on a control board 122 for management of LED drive, synchronous data acquisition, ATS control, calibration, color space calculations, communication of commands and data, power management, and/or various other tasks. The microprocessors may be embodied as a distributed, embedded processor system within the device 101. In certain embodiments, the microprocessor tasks can be performed by an external computing device or computer system. The device 101 may also be enabled for data communication and/or external control through use of an I/O board 124 and one or more I/O connectors 126.

In exemplary embodiments of the present disclosure, the disclosed illumination source is effective to over-illuminate the target surface TS to a degree that, inter alia, supports variations in the size of the target area TA. Thus, for example, the illumination source may be effective to illuminate a target surface TS characterized by a diameter that is at least fifty percent (50%) greater than the diameter of the smallest target area TA to be measured. In further exemplary embodiments of the present disclosure, the illumination source is effective to illuminate a target surface TS that is at least eighty percent (80%) greater than the diameter of the smallest target area TA to be measured. In this way, as the optical collection system moves between the closest position (e.g., position 176) and the farthest position (e.g., position 174), the disclosed over-illumination functionality ensures that adequate illumination is provided to capture a desired color measurement reading. Thus, for example, if the closest position is such that the diameter of the target area TA is one inch, at an 80% over-illumination level, the disclosed device would be effective in collecting appropriate color measurement data with the optical collection system repositioned away from the target surface TS such that the diameter of the target area TA is increased to 1.8 inches.

It can be seen that certain aspects of the devices 101 described herein are designed for rugged industrial use. For example, the use of LEDs in the illumination source 106B as solid state devices accommodate shocks and vibrations that may be experienced by the device 101 during use and operation. In another example, the filter wheel 116 is driven by a stepper motor 128. This is advantageous because stepper motors can be built for rugged applications, such as in linear actuators and transport devices used in mechanical assembly. Using the stepper motor 128 to spin the filter wheel 116 is a robust way to change from one filter wavelength to another in view of potential shocks and vibrations experienced in industrial environments.

The examples presented herein are intended to illustrate potential and specific implementations of the present disclosure. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In general, it will be apparent to one of ordinary skill in the art that some of the embodiments as described hereinabove may be implemented in many different embodiments of software, firmware, and/or hardware. The software code or specialized control hardware used to implement some of the present embodiments is not limiting of the present invention. For example, the embodiments described hereinabove may be implemented in computer software using any suitable computer software language type such as, for example, C or C++ using, for example, conventional or object-oriented techniques. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium. Such a medium may include any of the forms listed above with respect to storage devices and may further include, for example, a carrier wave modulated, or otherwise manipulated, to convey instructions that may be read, demodulated/decoded and executed by a computer.

It can also be appreciated that certain process aspects described herein may be performed using instructions stored on a computer-readable medium or media that direct a computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. A computer-readable medium may further involve one or more data signals transmitted on one or more carrier waves.

A "computer" or "computer system" may be, for example, a wireless or wire line variety of a microcomputer, minicomputer, server, mainframe, laptop, personal data assistant (PDA), wireless e-mail device (e.g., "BlackBerry" trade-designated devices), cellular phone, cable box, pager, processor, fax machine, scanner, or any other programmable device configured to transmit and receive data over a network. Computer devices disclosed herein may include memory for storing certain software applications used in obtaining, processing and communicating data. It can be appreciated that such memory may be internal or external to the disclosed embodiments. The memory may also include any means for storing software, including a hard disk, an optical disk, floppy disk, ROM (read only memory), RAM (random access memory), PROM (programmable ROM), EEPROM (electrically erasable PROM), and other computer-readable media.

In various embodiments of the present invention disclosed herein, a single component may be replaced by multiple components, and multiple components may be replaced by a single component, to perform a given function or functions. Except where such substitution would not be operative to practice embodiments of the present invention, such substitution is within the scope of the present invention.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A color measurement device for measuring the color of a target object, the device comprising:
   an illumination system including an illumination source having at least a white portion in combination with a chromatic portion, the illumination system being structured to generate light across a spectrum that includes the entire visual spectrum to spatially over-illuminate a predetermined target area on the target object, wherein the illumination system further comprises an illumination lens structured for operative association with the illumination source, the illumination lens comprising at least one optically fast lens, and at least one spatial intensity filter positioned in operative association with the illumination lens;

an optical collection system structured for non-contact color measurement of the target object, wherein the optical collection system is positioned in the device to function at a distance from the target object and receive light reflected therefrom; and a color engine in communication with the optical collection system configured for spectrally analyzing light detected by the optical collection system.

2. The color measurement device of claim 1, further comprising a synchronous modulation system structured to synchronize the frequency of the illumination source with at least one frequency of light detected by the optical collection system to exclude at least a portion of ambient light from a color measurement.

3. The color measurement device of claim 1, wherein the illumination lens is structured to provide spatially uniform illumination at a given target distance from the target object.

4. The color measurement device of claim 1, wherein at least a portion of the optical collection system is adapted to be repositioned relative to the target object, and wherein the illumination system is structured to generate a collimated beam of light sufficient to spatially over-illuminate a target measurement area on the target object.

5. The color measurement device of claim 4, wherein the illumination system is structured to over-illuminate the target measurement area by at least fifty percent as determined by the size of the target measurement area when the optical collection system is at its closest position relative to the target object.

6. The color measurement device of claim 1, wherein the illumination lens is structured for operative association with the illumination source; and the at least one spatial intensity filter is positioned next to the illumination lens.

7. The color measurement device of claim 6, wherein the spatial intensity filter is positioned next to a back plane of the illumination lens.

8. The color measurement device of claim 6, further comprising a first spatial intensity filter positioned at a front plane of the illumination lens and a second spatial intensity filter positioned at a back plane of the illumination lens.

9. The color measurement device of claim 6, wherein the spatial intensity filter is integral with the illumination lens.

10. The color measurement device of claim 9, wherein the spatial intensity filter is laser engraved with respect to the illumination lens.

11. The color measurement device of claim 1, wherein the optical collection system further comprises an image-based collection optic having a field stop at an image plane to define a target area plane for the target object.

12. The color measurement device of claim 11, further comprising the collection optic being structured to place the target area plane into focus at the image plane.

13. The color measurement device of claim 1, wherein the optical collection system further comprises a fiber optic collector for imaging light thereon, wherein a diameter of the fiber optic collector represents a field stop for defining a target area plane for the target object.

14. The color measurement device of claim 1, wherein the collection optical system further comprises a collection optic, and the collection optical system is configured to transmit light through the collection optic to a target area plane.

15. The color measurement device of claim 14, wherein the light transmitted to the target area plane through the collection optic is effective for active targeting of the optical collection system.

16. The color measurement device of claim 1, wherein the color engine further comprises a filter wheel configured for determining one or more colors of a target area on the target object.

17. The color measurement device of claim 16, wherein the filter wheel includes multiple interference filters of different wavelengths.

18. The color measurement device of claim 16, wherein the filter wheel is mechanically associated with a stepper motor.

19. The color measurement device of claim 1, wherein the illumination source is mounted on an active thermal stabilization block.

20. The color measurement device of claim 1, wherein the illumination source includes multiple LEDs.

21. The color measurement device of claim 1, wherein the illumination source includes a hybrid of white die plus chromatic die.

22. The color measurement device of claim 1, wherein the illumination source includes a combination of at least one white LED with a supplemental chromatic die.

23. The color measurement device of claim 1, wherein the entire visible spectrum generated by the illumination source includes light wavelengths in the range of about 390 nanometers to 710 nanometers.

24. The color measurement device of claim 1, wherein the frequency of the illumination source is in the range of at least about 25 kHz.

25. The color measurement device of claim 1, further comprising a housing structured to at least partially enclose at least one of the illumination systems, the optical collection system, and the color engine.

26. The color measurement device of claim 1, wherein the color engine in communication with the optical collection system is configured for spectrally analyzing light detected by the optical communication system on a discrete wavelength-by-wavelength basis across the entire visual spectrum.

27. A color measurement device for measuring the color of a target object, the device comprising:

an illumination system including an illumination source having at least a white portion in combination with a chromatic portion, the illumination system being structured to generate light in all portions of the visible spectrum and provide spatially uniform illumination at a given target distance from the target object sufficient to spatially over-illuminate a predetermined target area on the target object, wherein the illumination system further comprises an illumination lens structured for operative association with the illumination source, the illumination lens comprising at least one optically fast lens, and at least one spatial intensity filter positioned in operative association with the illumination lens;

an optical collection system structured for non-contact color measurement of the target object, wherein the optical collection system is positioned in the device to function at a distance from the target object and receive light reflected therefrom, the optical collection system further comprising an image-based collection optic having a field stop at an image plane to define a target area plane for the target object; and a color engine in communication with the optical collection system configured for spectrally analyzing light detected by the optical collection system.

28. The color measurement device of claim 27, further comprising a synchronous modulation system structured to synchronize the frequency of the illumination source with at least one frequency of light detected by the optical collection system to exclude at least a portion of ambient light from the color measurement.

29. The color measurement device of claim 27, wherein the color engine in communication with the optical collection system is configured for spectrally analyzing light detected by the optical communication system on a discrete wavelength-by-wavelength basis across the entire visual spectrum.

30. A color measurement device for measuring the color of a target object, the device comprising:

an illumination system including an illumination source having at least a white portion in combination with a chromatic portion, the illumination system being structured to generate light across a visible spectrum and provide spatially uniform illumination at a given target distance from the target object sufficient to spatially over-illuminate a predetermined target area on the target object, wherein the illumination system further comprises an illumination lens structured for operative association with the illumination source, the illumination lens comprising at least one optically fast lens, and at least one spatial intensity filter positioned in operative association with the illumination lens;

an optical collection system structured for non-contact color measurement of the target object, wherein the optical collection system is positioned to function at a distance from the target object and receive light reflected therefrom, the optical collection system further comprising an image-based collection optic having a field stop at an image plane to define a target area plane for the target object; and an additional light source aimed at the target object for active targeting of the optical collection system.

* * * * *